United States Patent [19]

Rupp

[11] Patent Number: 5,237,437
[45] Date of Patent: * Aug. 17, 1993

[54] APPARATUS AND METHOD FOR A HIGH CONTRAST, WIDE ANGLE, COLOR, FLAT PANEL, LIQUID CRYSTAL DISPLAY

[75] Inventor: John A. Rupp, Glendale, Ariz.

[73] Assignees: Honeywell Inc., Minneapolis, Minn.; Hosiden Corporation, Osaka, Japan

[*] Notice: The portion of the term of this patent subsequent to Sep. 22, 2009 has been disclaimed.

[21] Appl. No.: 827,854

[22] Filed: Jan. 30, 1992

Related U.S. Application Data

[63] Continuation of Ser. No. 452,672, Dec. 18, 1989, abandoned.

[51] Int. Cl.⁵ .............................................. G02F 1/13
[52] U.S. Cl. .............................................. 359/68; 359/73
[58] Field of Search ............... 350/333, 337, 339 F, 350/347 E, 334, 336, 346; 359/64, 66, 68, 73

[56] References Cited

U.S. PATENT DOCUMENTS

| | | | |
|---|---|---|---|
| 4,632,514 | 12/1986 | Ogawa et al. | 350/339 F |
| 4,929,060 | 5/1990 | Sugimoto et al. | 350/339 F |
| 4,946,259 | 8/1990 | Matino et al. | 350/339 F |
| 4,952,030 | 8/1990 | Nakagawa et al. | 350/339 F |
| 4,968,120 | 11/1990 | Depp et al. | 350/339 F |
| 4,969,718 | 11/1990 | Noguchi et al. | 350/339 F |
| 4,989,954 | 2/1991 | Yokoyama et al. | 359/63 |
| 5,150,235 | 9/1992 | Haim et al. | 359/73 |

FOREIGN PATENT DOCUMENTS

| | | | |
|---|---|---|---|
| 60-159824 | 8/1985 | Japan | 350/339 F |
| 60-159827 | 8/1985 | Japan | 350/339 F |
| 60-159831 | 8/1985 | Japan | 350/339 F |
| 60-217337 | 10/1985 | Japan | 350/339 F |
| 61-112129 | 5/1986 | Japan | 350/339 F |
| 61-121033 | 6/1986 | Japan | 350/334 |
| 62-127716 | 6/1987 | Japan | 350/334 |
| 63-104021 | 5/1988 | Japan | 350/339 F |
| 63-200122 | 8/1988 | Japan | 350/339 F |
| 63-291031 | 11/1988 | Japan | 350/334 |
| 1-50019 | 2/1989 | Japan | 350/339 F |

OTHER PUBLICATIONS

"The optical properties of twisted nematic liquid crystal structures with twist angles $\leq 90°$" C. H. Gooch and H. A. Tarry, J. Phys. D: Appl. Phys., vol. 8, 1975.

Primary Examiner—Rolf Hille
Assistant Examiner—Minhloan Tran
Attorney, Agent, or Firm—D. E. Jepsen; D. Lenkszus; R. Jensen

[57] ABSTRACT

In order to provide a high contrast, wide angle, color, liquid crystal display, the pixel elements each have subpixel color cells fabricated with a thickness of liquid crystal material through which light perpendicular to the display panel is transmitted that is less than the liquid crystal thickness for minimizing optical transmission when the subpixel cell is in an off-state. Using a thickness less than the thickness of liquid crystal material for minimizing off-state optical transmission on the axis perpendicular to the plane of the display panel (and component subpixel color cells) results in the minimum optical transmission at an off-axis viewing angle. By permitting a small amount of off-state optical transmission along the axis of the display (as a result of using a liquid crystal thickness less than the thickness required for minimizing undesired transmittance), a relatively small undesired transmittance of light for the liquid crystal cell display can be achieved over wide viewing angle. This thickness of liquid crystal for each pixel color is combined with an arrangement of color component cells for each pixel which minimizes the perceptible display image spatial noise.

20 Claims, 4 Drawing Sheets

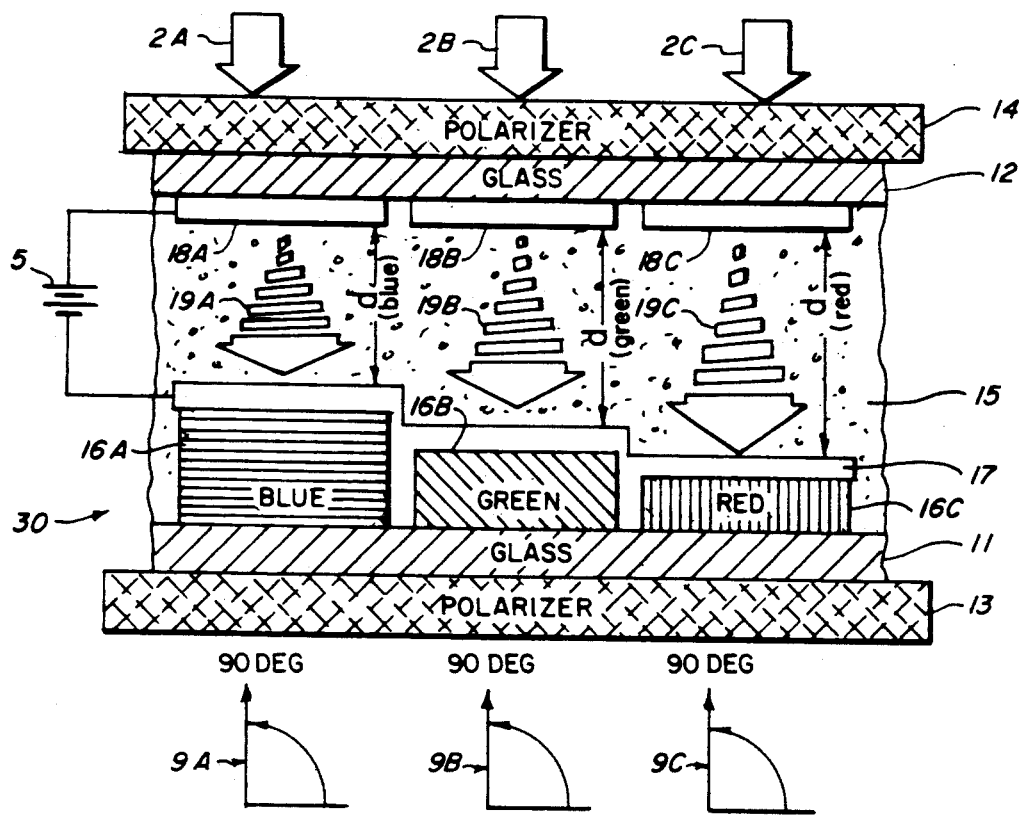
Fig. 3        PRIOR ART
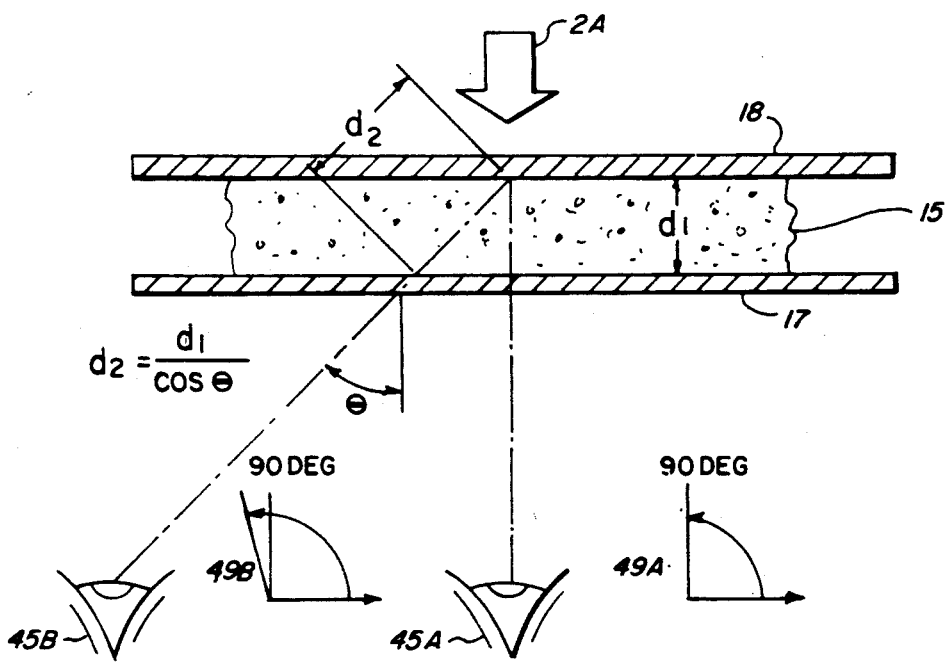
Fig. 4        PRIOR ART

APPARATUS AND METHOD FOR A HIGH CONTRAST, WIDE ANGLE, COLOR, FLAT PANEL, LIQUID CRYSTAL DISPLAY

This is a continuation of copending application Ser. No. 07/452,672 filed on Dec. 18, 1989 now abandone.

BACKGROUND OF THE INVENTION

Field of the Invention

This invention relates generally to flat panel, color, liquid crystal displays and, more particularly, to liquid crystal displays having a wide viewing angle and having reduced image noise patterns.

Description of the Related Art

The use of liquid crystal color displays has proven attractive for many applications, such as avionic parameter displays used in an aircraft flight deck. The liquid crystal displays can be implemented in a flat panel configuration, thereby reducing the volume requirement resulting from the use of cathode ray displays.

However, the flat panel liquid crystal color displays of the prior art have had certain features that have compromised their acceptability. For example, the crossed polarizer, twisted nematic type of liquid crystal display has a transmission through the liquid crystal cell that is uninhibited for zero applied voltage. This liquid crystal display configuration is referred to as a normally white display and is used in many display applications such as in watches and calculators. In the present invention, the linear polarizers are oriented in a mutually parallel configuration, providing a display that normally provides no optical transmission (i.e., normally black) when the liquid crystal is not activated and for which the optical transmission increases with applied voltage. Because of the properties of the liquid crystal material, undesired optical transmission can occur even in the liquid crystal cell off-state, the result of the rotatory dispersion of polarized light introduced into the liquid crystal material.

Referring to FIG. 1, the effect of the rotatory dispersion on the transmission of light in a color, liquid crystal flat panel display is shown. (Rotatory dispersion is a result of the optical rotation being a function of wavelength, $\lambda$). The flat panel display includes glass substrates 11 and 12 which enclose and contain the liquid crystal 15. A polarizer 14 is positioned on the exterior of substrate 12, while a polarizer 13 is positioned on substrate 11. On the interior surface of substrate 11 are positioned a multiplicity of color filters; blue filter 16A, green filter 16B, and red filter 16C are shown; and positioned over the interior surfaces of filters 16A through 16C is a transparent conducting electrode 17. The three filters permit the color components of a single image pixel to be individually controlled. Positioned on an interior surface of substrate 12 are a plurality of transparent conducting electrodes 18A–18C, each conducting electrode proximate an associated filter (16A–16C). The electrodes 18A–18C can be individually addressed by a controllable voltage supply 5 using an addressing apparatus not shown. In the absence of a voltage applied between electrodes and when the liquid crystal material 15 is a twisted nematic material providing normally black display, then, as unpolarized light 2A–2C is applied to the display, the light is polarized by polarizer 14. The polarized light 19A–19C travels through the twisted nematic liquid crystal, the polarized light is rotated through an angle of approximately 90° and is absorbed by polarizer 13 (which is oriented parallel to polarizer 12). The rotatory dispersion of polarized light, resulting from the wavelength dependence of the birefringence of the liquid crystal material, will generally provide a rotation that is different from the desired 90° optical rotation by an amount that is a function of the wavelength of the radiation. Thus, not all the light is absorbed by polarizer 13 and the display has undesirable off-state transmission. As will be shown below, a thickness of liquid crystal material can be found for which the optical rotation of the transmitted (green) radiation will be essentially 90°, i.e., will include no undesired components as shown by graph 9B. However, the longer wavelength red radiation will, at this distance, have a rotation less than 90°, cf. graph 9c; while the shorter wavelength blue radiation will be rotated through an angle greater than 90°, cf. graph 9A.

In an article by C. H. Gooch et al entitled "The Optical Properties of Twisted Nematic Liquid Crystals with Twist Angles 90°"' in J. Phys. D: Appl. Phys., vol 8, 1975, pp. 1575 to 1585; the transmission through a liquid crystal cell is given by $$T(\lambda,d) \approx \{\sin[\Theta x(1+u^2)^{\frac{1}{2}}]\}^2/(1+u^2)$$

where:
$u = u(\lambda,d) \approx \pi \times d \times \Delta n / \theta \times \lambda$
$\Delta n$ is the birefringence of the material
$\Theta \approx 90$ deg
$\lambda$ = radiation wavelength, and
$d$ = thickness of the liquid crystal.

Referring to FIG. 2, a plot of the optical transmission $T(\lambda,d)$ is shown as a function of thickness, d, of the liquid crystal medium. As will be clear from FIG. 2, each wavelength reaches the minimum transmission value at different thicknesses of liquid crystal medium. Comparing the graphs 9A–9C of FIG. 1 with the plot of transmission versus thickness of liquid crystal demonstrates that, for a single thickness of liquid crystal material, undesired radiation will always be transmitted by the cell, i.e., the first transmission minimum for the three colors is different. Therefore, the contrast ratio, the ratio of radiation transmitted in the transmitting mode of the cell versus the transmission of radiation in the nontransmitting mode of the cell will be reduced.

In U.S. Pat. No. 4,632,514 by Ogawa et al, issued Dec. 30, 1986, the contrast ratio for a twisted nematic liquid crystal flat panel display is improved by providing a thickness of the liquid crystal medium that is dependent on the filter through which the radiation passes. Referring to FIG. 3, the configuration of FIG. 1 is generally reproduced. However, the important difference is the blue radiation 19A, the green radiation 19B, and the red radiation 19C each travels through a different thickness of twisted nematic liquid crystal 15. The thickness d(blue) of liquid crystal material through which the blue radiation 19A travels, the thickness d(green) of liquid crystal through which the green radiation 19B travels, and the thickness d(red) of liquid crystal material through which the red radiation 19C travels are determined by the first minima of the optical transmission of FIG. 2. The result is that for each of the three component color radiation, the rotation of the polarized radiation resulting from the passage through the liquid crystal material is substantially 90° as shown in graphs 9A–9C.

The display described above provides a high contrast ratio for radiation viewed substantially perpendicular to the glass substrates, i.e., along the display axis. However, in many applications in which the use of liquid crystal displays would be most advantageous, the display must be viewed from an off-axis position.

Referring now to FIG. 4, an demonstration is provided illustrating why the contrast ratio is not maintained when the transmitted radiation is viewed off-axis. Impinging radiation 41 of a given color, when viewed on-axis by observer 45A, is rotated substantially 90° (cf. graph 49A) by the transmission through a distance $d_1$ of the liquid crystal material. However, when the observer 45B is viewing the radiation off-axis, the distance travelled by the radiation is $d_2 \approx d_1/\cos\Theta$, resulting in a rotation of the radiation in excess of 90°, thereby resulting in a deterioration of the contrast ratio. The contrast ratio deterioration will increase with increasing viewing angle.

A need has therefore been felt for a liquid crystal display in which a high contrast ratio can be achieved for a large range of off-axis viewing angles. In addition, a technique has been needed to reduce the image spatial noise in a liquid crystal display that will reduce the highly perceptible periodic spatial patterns.

FEATURES OF THE INVENTION

It is an object of the present invention to provide an improved display.

It is a feature of the present invention to provide an improved flat panel liquid crystal display.

It is another feature of the present invention to provide a color, flat panel, liquid crystal display having reduced undesired, dark state optical transmission over a wide viewing angle.

It is yet another feature of the present invention to select a thickness of liquid crystal material through which a color component must pass to improve the uniformity of image as a function of viewing angle.

It is still another feature of the present invention to provide a thickness of twisted nematic liquid crystal through which monochromatic radiation must pass which is less than the smallest thickness minimizing the transmission of the radiation with no electric field applied to the liquid crystal.

It is a still further feature of the present invention to provide a flat panel liquid crystal display in which the component color dots of each pixel have a triangular, or delta, configuration.

SUMMARY OF THE INVENTION

The aforementioned and other features are attain, according to the present invention, by providing; in a twisted nematic, flat panel liquid crystal display; a thickness of liquid crystal material, through which each radiation color component must pass, must meet predetermined requirements. In particular, each radiation color component must pass through a thickness of liquid crystal material that is less than the thickness for providing the smallest distance for which substantially no light is transmitted when the twisted nematic liquid crystal material is not subjected to an electric field. The thickness of the region of transmission can be selected for each radiation color component to provide an improved contrast ratio at an off-axis viewing angle. This configuration provides a generally symmetrical broadening of the luminance with viewing angle, making the display viewable at increased off-axis angles. The color dots of each pixel are arranged in a triangular configuration to minimize the observability of certain types of spatial noise patterns.

These and other features of the invention will be understood upon reading of the following description along with the drawings.

BRIEF DESCRIPTION OF THE DRAWINGS

FIG. 3 is a cross-sectional view of the flat panel light crystal display of FIG. 1 wherein the axial contrast ratio has been improved.

FIG. 4 illustrates the reason for the deterioration of the contrast ratio for off-axis viewing of transmitted radiation through a liquid crystal medium.

DESCRIPTION OF THE PREFERRED EMBODIMENT

1. Detailed Description of the Figures

Figure 5:
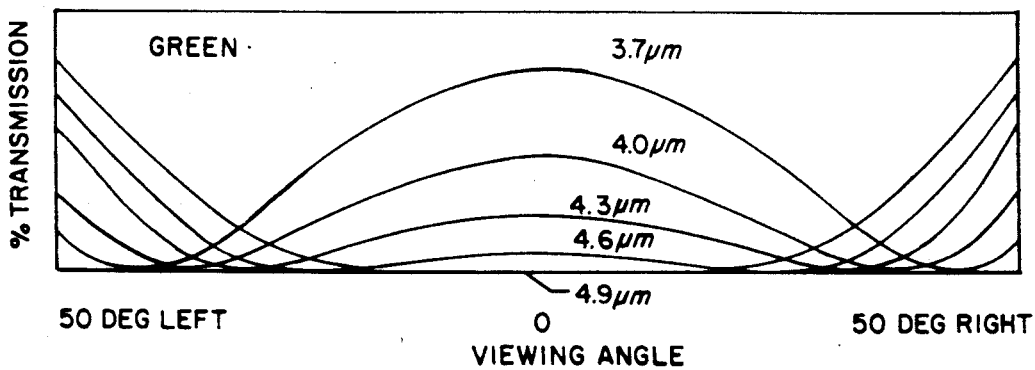
FIG. 5 illustrates the angular dependence of the off-state optical transmission on the thickness of the liquid crystal material for several thicknesses thinner than the minimum thickness.

Referring next to FIG. 5, the angular dependence of the transmission of radiation as the thickness of the liquid crystal medium is reduced from the value which produces the highest contrast ratio for on-axis transmission of light. As the thickness of the liquid crystal medium decreases, the zero transmission angle changes from the on-axis orientation to an increasingly large viewing angle. As the thickness of the liquid crystal medium is decreased from the first of the transmission minima, an increasing amount of light is transmitted on-axis, i.e., with a 0° viewing angle.

Figure 6:
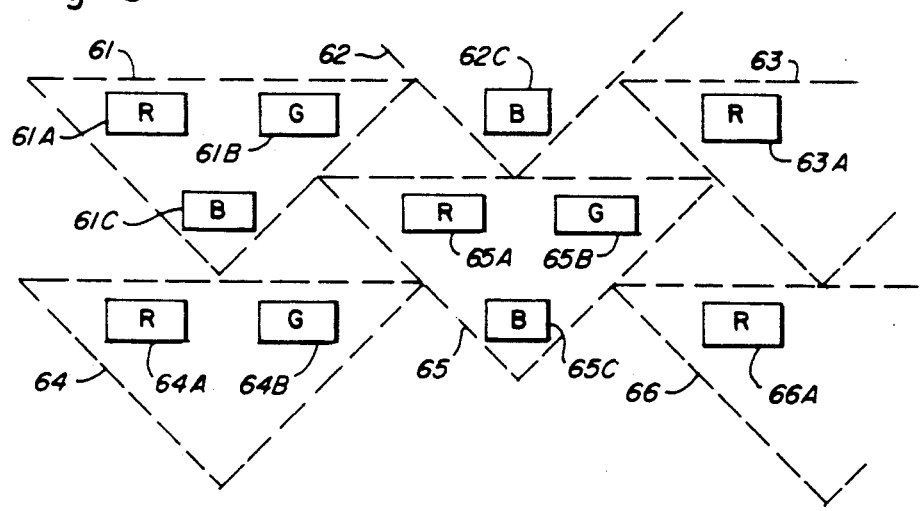
FIG. 6 illustrates the arrangement for color components of a pixel according to the present invention.

Referring next to FIG. 6, the arrangement of color components of an image pixel according to the present invention is shown. This arrangement, hereinafter referred to as the delta arrangement or configuration, provides a plurality of rows of dots, each dot providing a complementary color. The arrangement of the color dots is replicated in a row with a periodicity of three. An adjacent row has the same periodicity, but the color dots are shifted by one and one half color dot positions with respect of the adjacent row. An image pixel 61 is composed of two complementary color dots 61A and 61B from a row and a third complementary color dot 61C from an adjacent row. This arrangement disrupts the patterns produced by certain types of images and, consequently, the patterns become less discernable to an observer.

Figure 1:
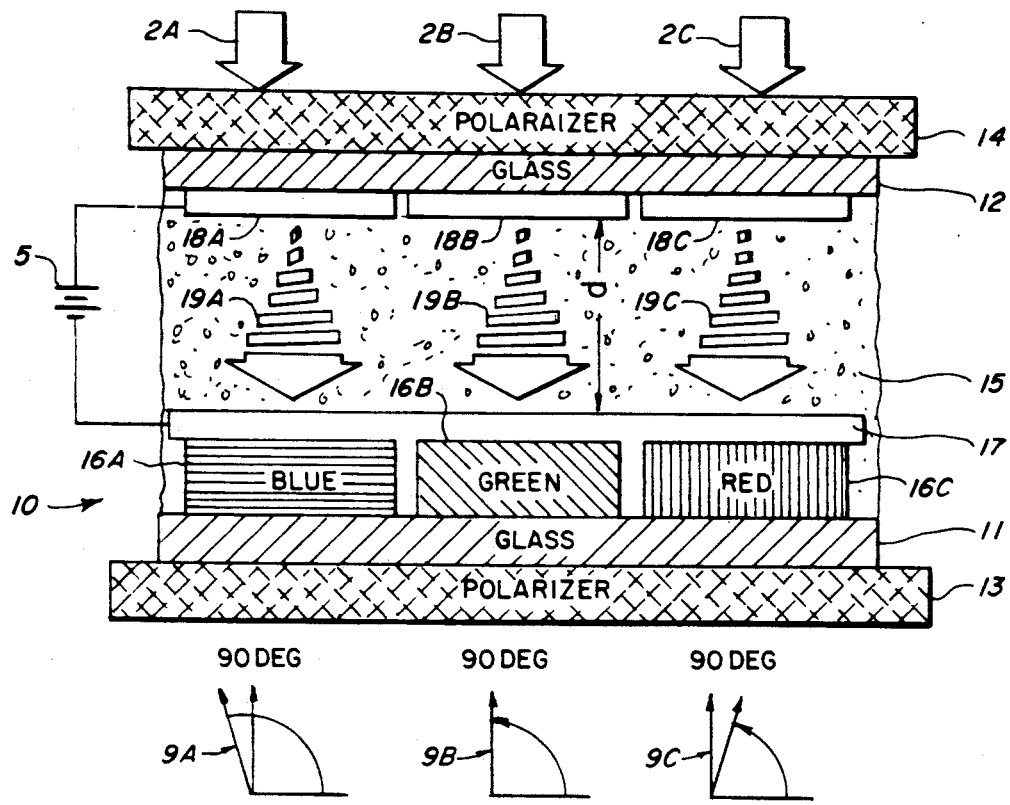
FIG. 1 is a cross-sectional view of a portion of a flat panel, liquid crystal, color, display.
Figure 2:
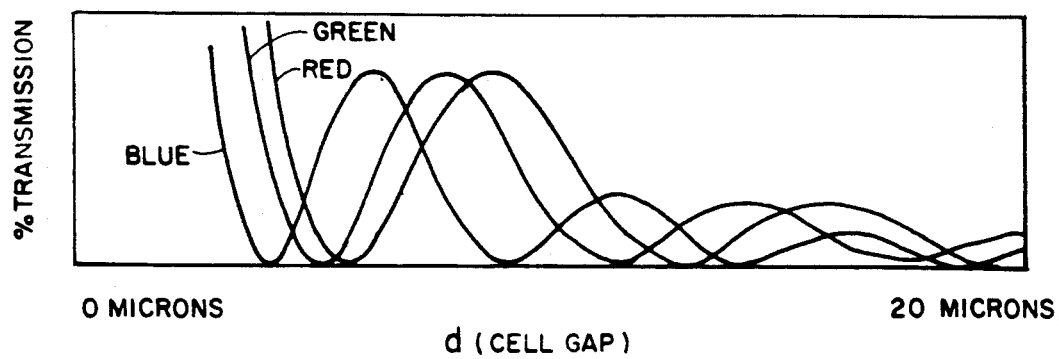
FIG. 2 is a plot of optical transmission light through a twisted nematic, liquid crystal as a function of thickness of the liquid crystal for a plurality of wavelengths.
Figure 7:
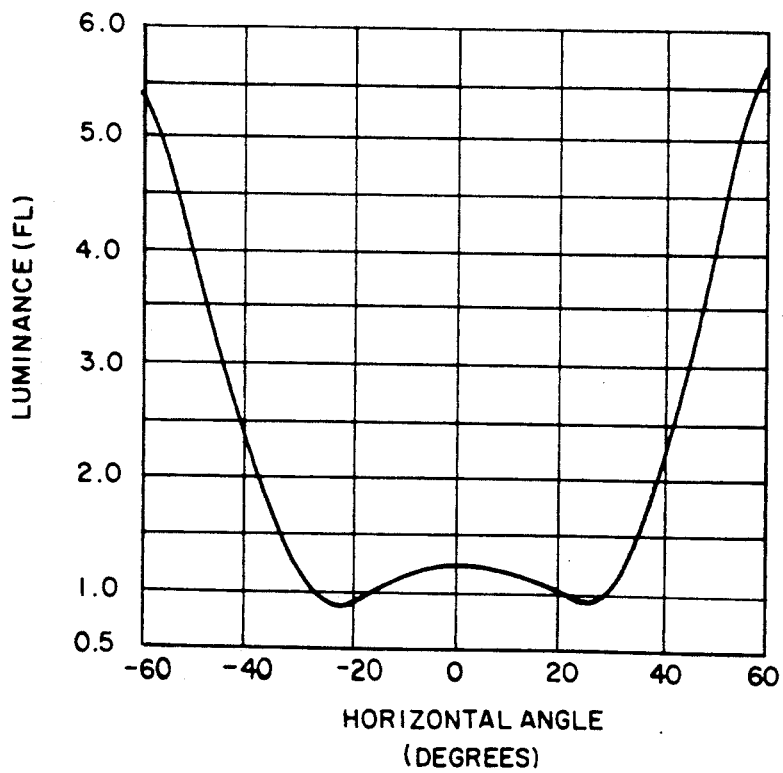
FIG. 7 illustrates the relationship between the (horizontal) viewing angle and the luminance of a liquid crystal display when the display is in an off-state mode, the display having the delta arrangement of color dots and having a thickness of the liquid crystal medium is less than the distance to minimize the on-axis radiation resulting from rotatory dispersion.

Referring next to FIG. 7, the luminance for a twisted nematic liquid crystal in the off-state is shown. The display has the delta arrangement of color dots for each pixel. The thickness of liquid crystal medium through which each radiation color component passes is less than the thickness for first radiation color component minimum (cf. FIG. 2). The luminance has a local maximum at the on-axis (0°) viewing angle, goes through a relatively symmetric local minimum (at approximately 20°), and increases rapidly thereafter. An extended local region of relatively low off-state luminance is provided over a relatively large angle.

Figure 8:
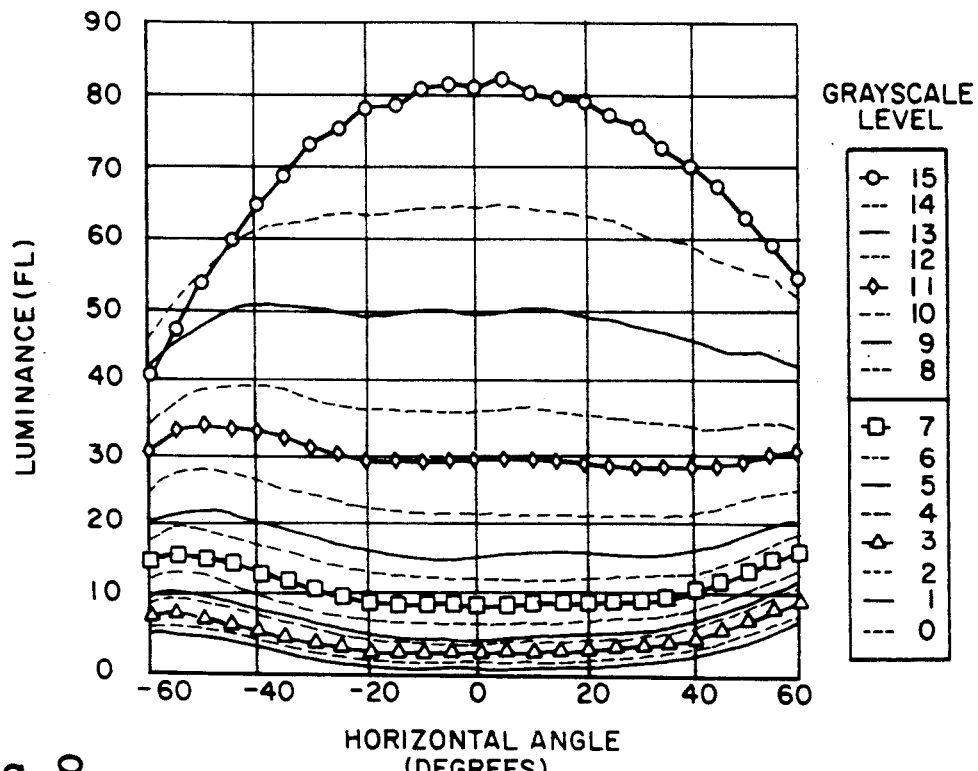
FIG. 8 illustrates the angular dependence of the luminance for the liquid crystal display of the present invention as a function of grayscale level for transmitted radiation.

Referring next to FIG. 8, the white radiation for a multiplicity of grayscale levels as a function of (horizontal) viewing angle is shown. The display uses a twisted nematic liquid crystal with the thickness of the liquid crystal, through which each radiation color component travels, that is less than the first minimum derived from minimizing the radiation color component optical dispersion (i.e., the first minimum of FIG. 2 for the radiation color component). For the highest grayscale levels, the radiation has a distinct maximum for the on-axis viewing angle (0°), a result of the substantially completely oriented liquid crystal molecules. Where the liquid crystal molecules are less than completely oriented at lower grayscale levels, relatively uniform luminance is observed over a wide viewing angle.

Figure 9:
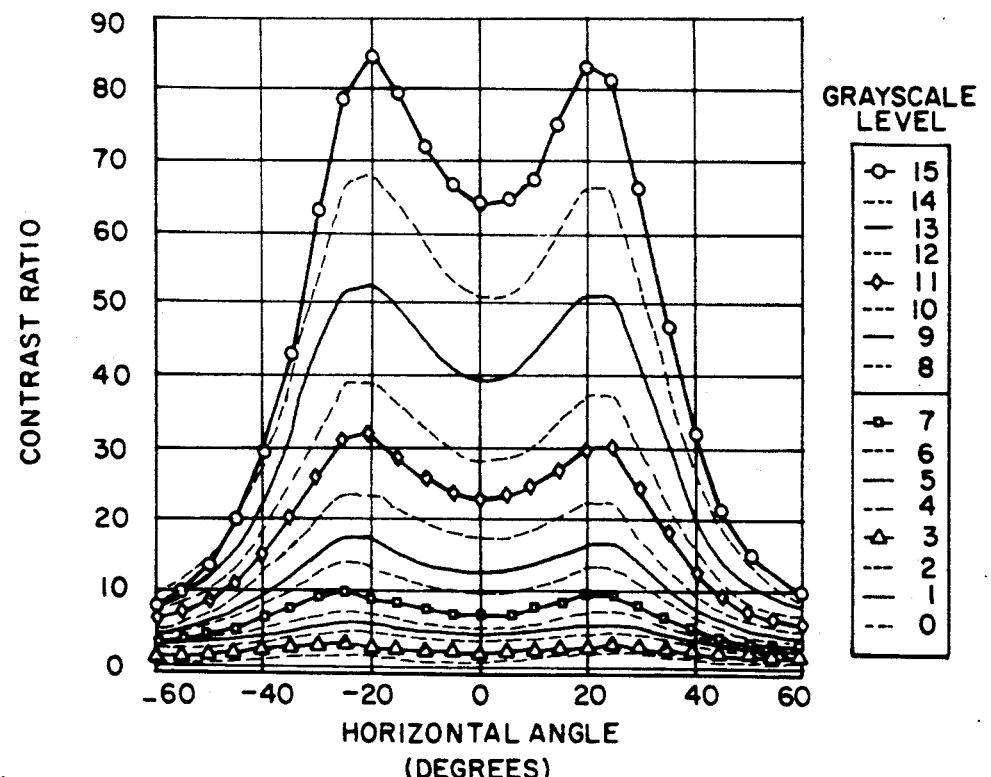
FIG. 9 illustrates the angular dependence of of the contrast ratio as a function of angle for several grayscale levels.

Referring to FIG. 9, the angular dependence of the contrast ratio for several grayscale levels are shown. Once again, the contrast ratio as a function of angle is shown for a flat panel, color, liquid crystal display in which the liquid crystal material is a twisted nematic liquid crystal. The thickness of liquid crystal material is less than the thickness providing the first minimum for optical transmission of the radiation color component (i.e., the first minimum of FIG. 2 for the radiation color component). The contrast ratio has a generally symmetric off-axis maxima and has a local minimum generally on-axis (0°). On either side of the maxima, the contrast ratio falls off rapidly with increasing viewing angle.

2. Operation of the Preferred Embodiment

The liquid crystal display of the present invention provides a display with a relatively large off-axis viewing angle. The improved viewing angle characteristic is accomplished by determining the first minimum thickness for transmission of monochromatic light through the 90° twisted nematic liquid crystal. The undesired radiation color component resulting for rotatory dispersion is minimized for a normally black twisted nematic liquid crystal display cell having the first minimum thickness. After this thickness has been determined, then the thickness of liquid crystal material through which the monochromatic light must pass is reduced, providing a minimum off-state transmission at an off-axis viewing angle. This display configuration results in a more uniform transmission of radiation as a function of viewing angle, particularly at lower grayscale levels. In addition to the uniformity over a greater angle, the configuration of the present invention results in greater symmetry for the radiation viewed off-axis.

The present invention further envisions that the pixels of the display will be implemented by color dots or subpixels that are arranged in a triangular or delta array. This array disrupts certain types of spatially oriented image noise and results in the noise patterns being more difficult to observe.

The foregoing description is included to illustrate the operation of the preferred embodiment and is not meant to limit the scope of the invention. The scope of the invention is to be limited only by the following claims. For the foregoing description, many variations will be apparent to those skilled in the art that would yet be encompassed by the spirit and scope of the invention.

What is claimed is:

1. A wide view angle, flat panel liquid crystal display for displaying color images, said display comprising:
   a multiplicity of pixels, each pixel including a plurality of subpixels, each subpixel adapted to transmit a preselected color component, each subpixel having:
   a region of liquid crystal, a pair of electrodes bounding said region of liquid crystal, said electrodes and said region of liquid crystal being in a radiation path of said color component,
   a first and a second polarizer in said radiation path, said first and said second polarizers being external to said pair of electrodes, and
   a filter in said radiation path, said filter determining said preselected color transmitted by said radiation path for said each subpixel, wherein the thickness of said region of liquid crystal is less than the thickness of a region of liquid crystal which would produce a first local minimum of an off state on axis transmission of said color component through said region of liquid crystal.

2. The display of claim 1 wherein each pixel includes three subpixels, said three subpixels positioned in a generally triangular arrangement.

3. The display of claim 1 wherein said plurality of subpixels includes a first subpixel for transmitting a red color component, a second subpixel for transmitting a green color component, and a third subpixel for transmitting a blue color component.

4. The display of claim 1 wherein said liquid crystal is a twisted nematic type of liquid crystal.

5. The display of claim 4 wherein said polarizers are oriented in mutually parallel directions, a subpixel without a voltage applied thereto being in an off-state.

6. The display of claim 1 wherein a thickness of a liquid crystal subpixel cell has a minimum transmission for an off-state of said liquid crystal cell at a viewing angle of approximately 20°.

7. The display of claim 6 further comprising activation means for applying a controllable voltage to each subpixel of said display.

8. A method of providing a wide view angle, liquid crystal display, said method comprising the steps of:
   providing said display with a multiplicity of pixels, each pixel related to a display point;
   implementing each pixel of said liquid crystal display with a plurality of subpixels, each subpixel of a liquid crystal display pixel transmitting a preselected radiation color component;
   fabricating each subpixel wherein a thickness of a liquid crystal material of each subpixel is determined by a preselected color component transmitted on-axis therethrough, a thickness of a liquid crystal material for each subpixel being less than the thickness of liquid crystal material which would produce a first on-axis local minimum for said preselected color component transmission when said subpixel is in an off-state, said first on-axis local minimum being determined at zero viewing angle; and controlling an intensity of a preselected component transmitted through each subpixel by controlling a voltage applied to said each subpixel.

9. The method of claim 8 wherein said fabricating step further includes the step of selecting a liquid crystal thickness having a first off-axis local minimum for a preselected color component transmitted through a subpixel at a preselected off-axis viewing angle for said off-state.

10. The method of claim 9 wherein said dividing step includes a step of selecting a first subpixel for transmitting a red color component, selecting a second subpixel for transmitting green color component, and selecting a third subpixel for transmitting blue color component.

11. The method of claim 10 further comprising a step of arranging each subpixel in a triangular configuration.

12. The method of claim 11 further comprising a step of arranging polarizers of said liquid crystal display wherein said an off-state configuration for each subpixel results when an activation voltage is not applied thereto.

13. The method of claim 12 further comprising a step of using a twisted nematic liquid crystal in said liquid crystal display.

14. The method of claim 9 wherein said preselected off-axis viewing angle is chosen to be approximately 20°.

15. A flat panel, wide view angle liquid crystal display for displaying color images, said display comprising:

a group of first subpixels, each of said first subpixels having a first filter for transmitting radiation having a first color component through said first subpixels, said first subpixels having a first thickness of a liquid crystal through which said first color component is transmitted, said first thickness being less than a thickness for providing a first on-axis minimum for transmission of said first color component for an off-state subpixel at a zero viewing angle;

a group of second subpixels, each of said second subpixels having a second filter for transmitting a second color through said second subpixels, said second subpixels having a second thickness of liquid crystal through which said second color component is transmitted, said second thickness being less than a thickness for providing a first on-axis local minimum for transmission of said second color component for an off-state subpixel at a zero viewing angle;

a group of third subpixels, each of said third subpixels having a third filter for transmitting a third color component through said third subpixel, said third subpixels having a third thickness of liquid crystal through which said third color component is transmitted, said third thickness being less than a thickness for providing a first on-axis local minimum for transmission of said third color component for an off-state subpixel at a zero viewing angle; and voltage control means coupled to each of said first, second, and third subpixels for controlling an intensity of transmission of an optical component through said each subpixel.

16. The display of claim 15 wherein said liquid crystal is a twisted nematic liquid crystal.

17. The display of claim 16 wherein said subpixels include polarizers on either side of said liquid crystal material having a parallel orientation therebetween, an off-state of a subpixel adapted to occur when a voltage is not applied to said subpixel.

18. The display of claim 17 wherein said first thickness provides a minimum transmission of said first color radiation for a subpixel off-state at a preselected off-axis viewing angle.

19. The display of claim 18 wherein said preselected off-axis viewing angle is 20°.

20. The display of claim 19 wherein said display includes a multiplicity of pixels; each pixel of said display including a first subpixel from said first group of subpixels, a second subpixel from said second group of subpixels, and a third subpixel from said third group of subpixels; said first, said second, and said third subpixels being positioned in a triangular arrangement within said pixel.

* * * * *